United States Patent
Wójcik et al.

(10) Patent No.: US 10,139,114 B2
(45) Date of Patent: Nov. 27, 2018

(54) METHOD OF CONSTRUCTION OF A WALL HEATING PANEL AND A WALL HEATING PANEL

(71) Applicants: Janusz Wójcik, Bestwina (PL); Marek Wójcik, Bestwina (PL); Pawel Wójcik, Kraków (PL)

(72) Inventors: Janusz Wójcik, Bestwina (PL); Marek Wójcik, Bestwina (PL); Pawel Wójcik, Kraków (PL)

( * ) Notice: Subject to any disclaimer, the term of this patent is extended or adjusted under 35 U.S.C. 154(b) by 0 days.

(21) Appl. No.: 15/538,665

(22) PCT Filed: Aug. 26, 2015

(86) PCT No.: PCT/PL2015/000139
§ 371 (c)(1),
(2) Date: Jun. 22, 2017

(87) PCT Pub. No.: WO2016/032351
PCT Pub. Date: Mar. 3, 2016

(65) Prior Publication Data
US 2018/0003396 A1  Jan. 4, 2018

(30) Foreign Application Priority Data
Aug. 28, 2014  (PL) .......................................... 409296

(51) Int. Cl.
*F24D 3/12* (2006.01)
*F24D 3/14* (2006.01)
(Continued)

(52) U.S. Cl.
CPC .............. *F24D 3/125* (2013.01); *E04C 2/043* (2013.01); *E04C 2/525* (2013.01); *E04F 13/12* (2013.01);
(Continued)

(58) Field of Classification Search
CPC ................ E04F 13/12; E04F 2290/023; F24D 2220/07; F24D 3/125; F24D 3/142;
(Continued)

(56) References Cited

U.S. PATENT DOCUMENTS 5,931,381 A * 8/1999 Fiedrich .................... F24D 3/14
165/49
6,805,298 B1 * 10/2004 Corbett .................. F24D 3/142
165/56
(Continued)

FOREIGN PATENT DOCUMENTS

EP    0177660 A1 *  4/1986  .......... F28D 1/0226
EP    0807795 A2 * 11/1997  .......... F28D 1/0226
(Continued)

*Primary Examiner* — Jacob J Cigna
(74) *Attorney, Agent, or Firm* — Mark M. Friedman

(57) ABSTRACT

The method of construction of a wall heating panel and a wall heating panel consists in constructing an aluminium multi-channel collector, preferably with one phase transition channel, connecting it inseparably with vertical aluminium heating elements, arranging the heating elements in the grooves of a dry wall construction board, preferably magnesium, and filling the space between the grooves and the heating elements with elastic compound, and then applying paper—aluminium foil laminate onto the whole surface of the board. A wall heating panel consists of an aluminium collector (1) with stub pipes (2), inside the collector there are horizontal parallel phase transition channels (3) and a water channel (4), the phase transition channel (3) is inseparably connected with the vertical aluminium heating elements (5) which are inserted into the grooves of the dry wall construction board (6), spaces between the grooves and the heating elements are filled with elastic compound (7) and sealed with paper—aluminium foil laminate (8), whereas the top part of the collector (1) adjoins the bottom surface of the board (6).

7 Claims, 3 Drawing Sheets

Figure 4:
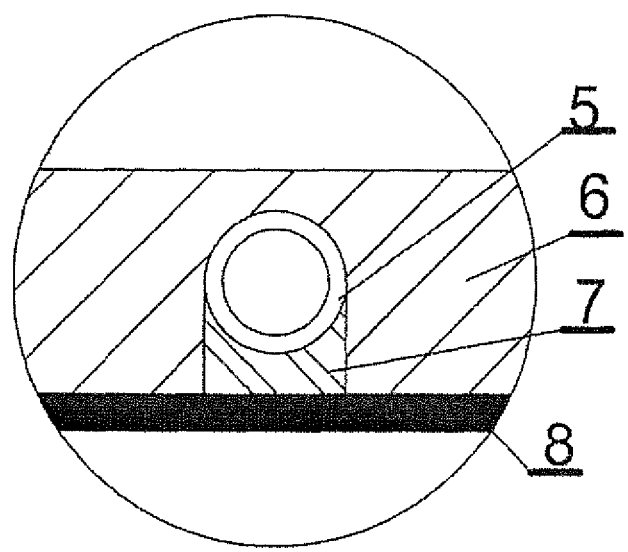

(51) Int. Cl.
*F28D 15/02* (2006.01)
*E04F 13/12* (2006.01)
*E04C 2/04* (2006.01)
*E04C 2/52* (2006.01)
*F28D 15/06* (2006.01)
*F28D 21/00* (2006.01)

(52) U.S. Cl.
CPC .............. *F24D 3/142* (2013.01); *F28D 15/02* (2013.01); *F28D 15/0275* (2013.01); *F28D 15/06* (2013.01); *E04F 2290/023* (2013.01); *F24D 2220/07* (2013.01); *F28D 2021/0035* (2013.01)

(58) Field of Classification Search
CPC ............... F28D 1/0226; F28D 15/0275; F28D 15/0283; F28D 15/06; F28D 2021/0035
See application file for complete search history.

(56) References Cited

U.S. PATENT DOCUMENTS

| | | | | |
|---|---|---|---|---|
| 2004/0026525 | A1* | 2/2004 | Fiedrich | F24D 3/142 |
| | | | | 237/69 |
| 2011/0232883 | A1* | 9/2011 | Fiedrich | E04C 2/525 |
| | | | | 165/168 |
| 2015/0176847 | A1* | 6/2015 | Shin | F24H 1/121 |
| | | | | 237/69 |

FOREIGN PATENT DOCUMENTS

| | | | | | |
|---|---|---|---|---|---|
| JP | 55063393 | A | * | 5/1980 | ........... F28D 1/0226 |
| JP | 56007990 | A | * | 1/1981 | ........... F28D 1/0226 |
| JP | 58092733 | A | * | 6/1983 | ............... F24D 3/14 |
| JP | 2003130378 | A | * | 5/2003 | ........... F28D 1/0226 |
| PL | 170254 | B1 | * | 11/1996 | |
| PL | 396172 | A1 | * | 2/2012 | |
| PL | 399104 | A1 | | 4/2013 | |
| WO | WO-0250479 | A1 | * | 6/2002 | ............. F24H 3/004 |
| WO | WO-2011006494 | A2 | * | 1/2011 | ................ C09K 5/04 |

* cited by examiner

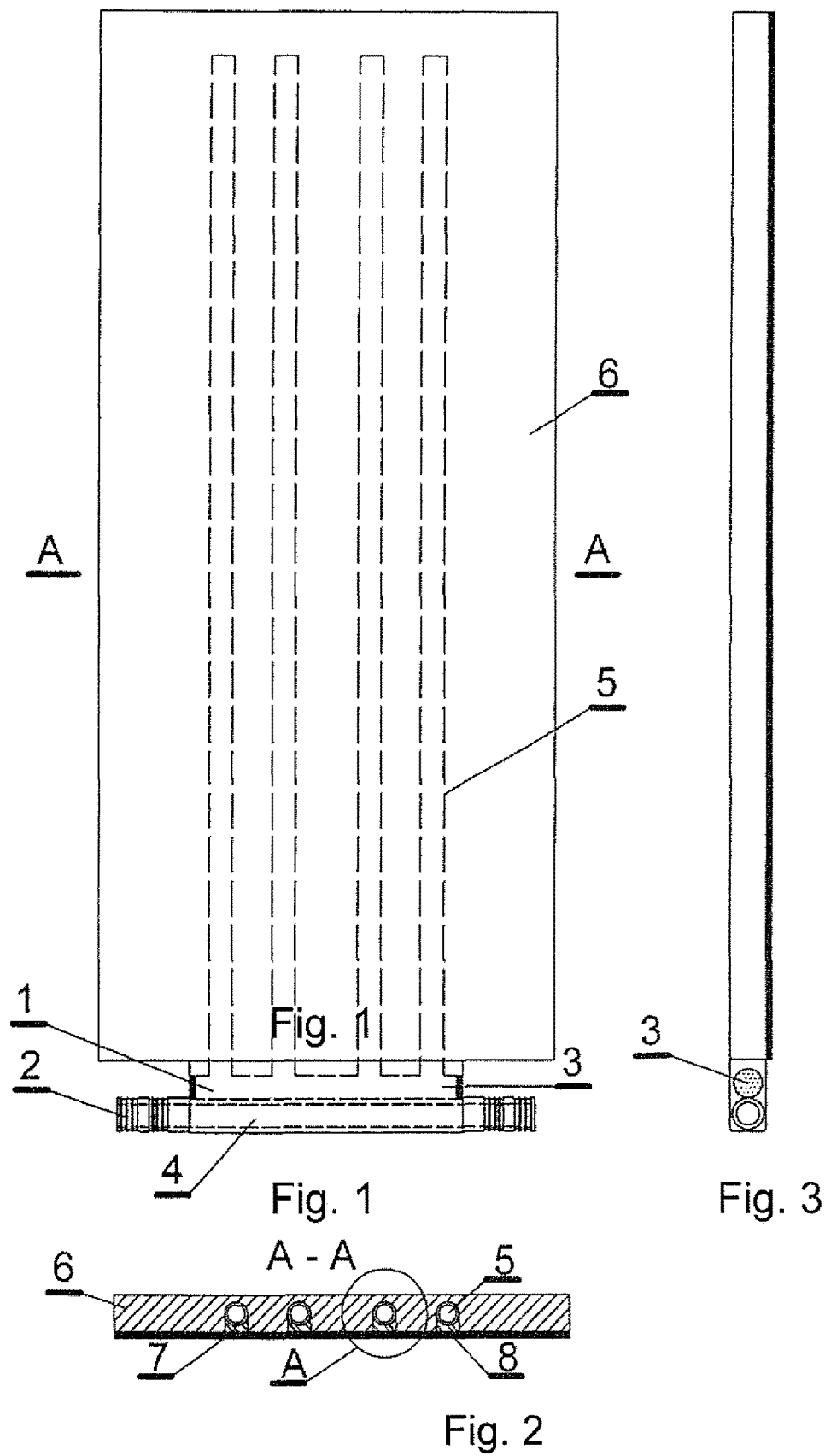

detail A

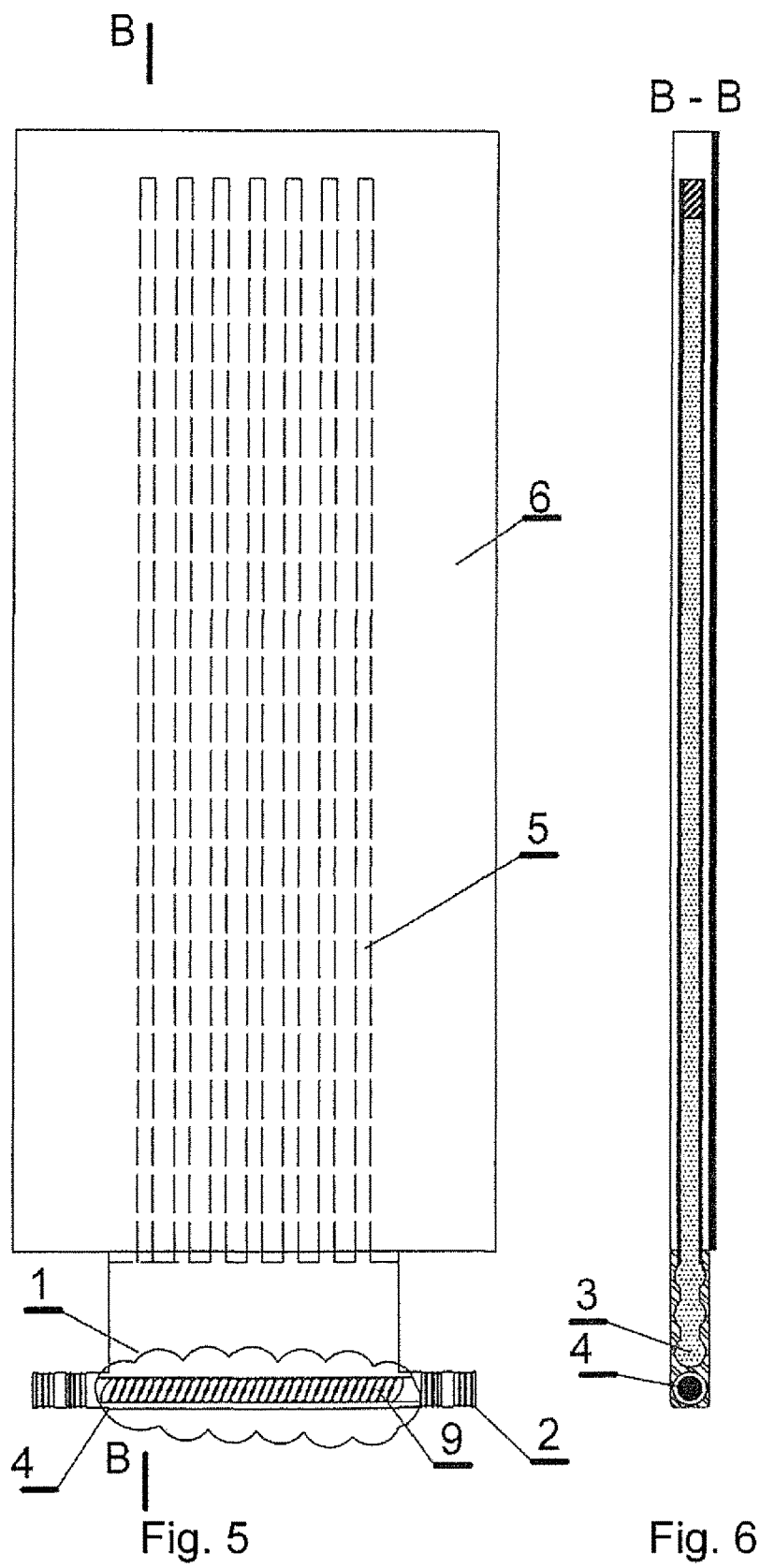

METHOD OF CONSTRUCTION OF A WALL HEATING PANEL AND A WALL HEATING PANEL

The subject of the invention is the method of construction of a wall heating panel and a wall heating panel for dry wall construction, in particular from plasterboard or magnesium board.

Known heating systems are based on the phenomenon of the thermodynamic medium phase transition, they are made from copper or stainless steel pipes. A pipe, through which heating medium, mostly water, flows, goes through a horizontal collector. Vertical heating elements are connected with the collector through soldered or welded joints, thus, they create a tight system filled with a specified amount of the thermodynamic medium under appropriate pressure that ensure correct functioning of the system. Under the influence of heat supplied from the heating system, phase transition of the thermodynamic medium occurs in the collector; liquid phase passes into gas phase. The gas phase floating in the vertical heating elements gives them heat and there occurs another phase transition from the gas phase into the liquid phase which flows back to the collector. A set of several systems is joined into one heating circuit, installed on the room walls and coated with plaster.

There are known modular walls for dry construction consisting of gypsum cellulose fibreboards fixed to a wooden structure. Inside the board there is an integrated five-layer modular pipe which creates a heating loop. There are also known modular panels from gypsum fibreboards with built-in multilayer pipes of dia. 10 mm, with an aluminium separator. Multilayer pipes are pre-installed in the board grooves. Thus constructed modular panels are installed with their smooth side facing the room. After cracks and openings are filled in, the panels can be painted, wallpapered or coated with a thin layer of plaster.

From the patent application P.397667 there is known a modular board of low thermal inertia of the pipe module for dry wall construction. The board is made from the mixture of ceramic material, in its volume it has heating pipes in the form of heat pipeline modules with at least two transformation channels. In the transformation channels, connected through a wall with a flow channel equipped with connections, the phase transition in closed space is completed. The transition channels with the flow channel and the channel which distributes heat energy throughout the board volume, metal layer preferably in the form of metal mesh, constitute the framework, and are inseparably bound with each other with a ceramic material compound. The board additionally possesses an integrated reinforcement in the form of metal foil, preferably perforated aluminium foil on the board surface, or scraps of fabrics, foil flakes, sections of wire as reinforcement dispersed in the ceramic material volume. The transition channel has the cross-section of less than 7 sq cm. The board thickness is similar to the thicknesses of known system boards for dry wall construction.

The purpose of the invention is to develop a method of construction of a wall heating panel for dry wall construction, and a heating panel constructed with this method.

The essence of the invention is the method of construction of a heating panel where a collector with many horizontal parallel channels, preferably with one phase transition channel, is made from a multi-channel aluminium profile, a water channel, and at both ends of the water channel of the collector stub pipes for system water heating installations connections are turned, the ends of the phase transition channels are permanently plugged, and then the vertical aluminium elements, previously plugged at the top, are inseparably connected with the phase transition channels, the system constructed with this method is inspected in a known manner for tightness, then the air is removed from the system, which is then filled with the known thermodynamic medium in the amount up to 95% of the system volume and tightly closed, the vertical heating elements are inserted into previously made grooves of the dry wall construction board, preferably magnesium board, whereas the collector connected with the heating elements adjoins the bottom edge of the board, spaces of the grooves with the heating elements are coated with elastic compound, preferably gypsum and acrylic compound, then preferably paper—aluminium foil laminate is glued onto the whole surface of the board.

The collector is connected to the vertical heating elements in such a way that the collector is heated up to the temperature of 200-400° C., and the heating elements are cooled down to −195° C. by immersion in liquid nitrogen for up to 5 minutes, and then the collector and the vertical heating elements become permanently connected by uniform motion of cylinders, or the vertical heating elements are screwed into openings made in the collector which connect them with the phase transition channels, then the threaded joint is degreased and sealed with anaerobic resin.

The essence of the wall heating panel is that it consists of an aluminium collector made from a multi-channel aluminium profile, preferably with one parallel horizontal phase transition channel plugged at both ends, and a horizontal water channel ended at both sides with stub pipes, vertical heating elements inseparably connected with phase transition channels, a board for dry wall construction, preferably a magnesium board, in which in the grooves of the shape corresponding to the external shape of the heating elements the heating elements, covered on the whole surface of the board with preferably paper—foil laminate, are installed, and the collector connected with the heating elements adjoins the bottom edge of the board or the top edge of the board.

The internal diameter of the channels is from 3 to 50 mm, and the heating elements have a closed section profile, whose section area amounts from 1 sq mm to 625 sq mm. Inside the collector channel there is a spiral, preferably from stainless steel, of the coil diameter equal to the channel diameter, and the pitch of 2-20 mm. Whereas the board for dry wall construction is from 8 mm to 25 mm thick.

The method of construction of the wall heating panel consists in that a horizontal collector from a stamped aluminium profile with two parallel round channels is made, as a result of appropriate machining one of them is turned into a water channel and stub pipes for heating installation connection are formed. Instead of water cycle, electric heaters of proper power can be also installed in this channel. The vertical aluminium heating elements are permanently fixed to the other channel from the top. Everything is tightly closed and a chamber of the thermodynamic medium phase transition is created. Due to the application of aluminium in the system construction, heat transfer from the heating medium to the thermodynamic medium is very efficient. This system is fixed to the wall board for dry wall construction, e.g. a magnesium board or plasterboard, after having made appropriate grooves that house the vertical heating elements, free space between the board and the aluminium profile is filled with elastic gypsum and acrylic compound and/or covered with cardboard, preferably paper—aluminium foil laminate that additionally creates a screen reflecting infrared rays, increasing thermal efficiency. The constructed wall heating panel can be joined into sets by connecting water channels into one circuit and installing it in rooms directly on the walls, wooden structures or system scaffoldings for plasterboards. In contrast to the previously described elements of phase heating systems installed directly on the walls, this solution eliminates the need to make laborious traditional plasters or gypsum finish. Moreover, by supplying to the water channel water of the temperature lower than the ambient temperature, the wall panel absorbs heat from the ambient surroundings and performs a cooling function.

The invention is presented in embodiments on the drawings, where

FIG. 1 presents the wall heating panel,
FIG. 2—A-A section of the heating panel,
FIG. 3—panel in the side view,
FIG. 4—detail A of the panel A-A section,
FIG. 5—view of the wall panel with presentation of a fragment of the water channel,
FIG. 6—vertical section of the heating panel.

EMBODIMENT 1

The method of construction consists in that a two-channel collector 1 with two parallel horizontal channels 3 and 4 is made from a rectangular cross-section aluminium profile of the length appropriate for the dry wall construction plasterboard width and thickness, at the ends of the bottom channel 4 of the collector 1 stub pipes 2 for system connection of water heating installations are turned. At the ends of the top channel 3 internal threads for permanent plugging are made. In the top wall of the collector 1 profile four threaded pass-through openings, spaced equally along the collector 1 length for connecting aluminium heating elements 5 with the top channel 3 are made. Aluminium profiles of heating elements 5 have an internal channel of 1 sq mm section of the length of 450 mm, at the top ends they are permanently plugged through screwing in plugs and sealing with anaerobic resin, at the other end an external thread is made for connection with the collector. Threaded elements are degreased and joined with the use of anaerobic resins which are polymerizable in the conditions of air absence and which permanently seal threaded joints. Air is removed from the system with the use of a vacuum pump and the system is filled with a known thermodynamic medium, dichloromethane or isobutane in the amount of the liquid phase to 95% of the system volume, and tightly closed. This system is fixed to a plasterboard from the bottom side after having made appropriate grooves for inserting vertical heating elements 5.

The collector is permanently connected with the vertical heating elements and adjoins the plasterboard 6 from the bottom side. Space between aluminium heating profiles 5 after they have been inserted into profiled grooves of the board 6 is filled with elastic gypsum and acrylic compound 7, then cardboard glue and paper—aluminium foil laminate 8 are applied onto the whole board that additionally creates a screen reflecting infrared rays. The constructed wall heating panel can be joined into a set and the panel is installed directly on the wall, the laminate-covered side inwards.

EMBODIMENT 2

A four-channel collector of the length corresponding to the width of the magnesium board for dry wall construction is made from an aluminium profile of circular cross-section, at both ends of the water channel 4 of the collector 1 stub pipes 2 of the length of 10-50 mm for system connection of water heating installations are turned. Phase transition channels 3 parallel to the water channel 4 of the collector 1 are at both ends permanently plugged. In the top wall of the collector 1 seven pass-through openings of the diameter d1, connecting three parallel horizontal phase transition channels 3 of the collector 1 are made, into which perpendicular aluminium heating elements 5 of the internal channel of the cross-section of 625 sq mm and length of 2500 mm are fixed, the ends of the heating channels 5 are turned on the outside to the diameter d2, whereby d1 is smaller than d2, the other ends of the heating channels are permanently plugged. The aluminium collector 1 is heated up in the furnace to the temperature of 200 to 400° C., whereas the aluminium profiles 5 of the heating elements are cooled down to −195° C. by immersion in liquid nitrogen for the time from 2 seconds to 5 minutes, and then the collector 1 and the vertical heating elements 5 are connected through uniform movement of synchronised pneumatic cylinders, which push forward the heated collector towards the cooled vertical heating elements, connecting them permanently. The thus created system undergoes slow cooling down to the ambient temperature. Then the threaded elements are degreased and joined with each other with the use of anaerobic resin. After the resin hardens within 1-30 minutes, tightness of joints is checked with the use of helium and a helium leak detector. Air is removed from the system with the use of a vacuum pump and the system is filled with thermodynamic medium in the amount of the liquid phase to 95% of the system volume, and tightly closed. On the bottom side of the magnesium board grooves whose dimensions allow the heating elements to be fully inserted, are made. Free spaces 7 between the magnesium board 6 and the aluminium heating profiles are filled with elastic gypsum and acrylic compound 7, to level the surface. The whole surface of the magnesium board is covered with cardboard glue and paper—aluminium foil laminate 8 is applied with its paper side, that additionally creates a screen reflecting infrared rays. The created wall heating panel can be joined into a set and installed directly on the walls with the cardboard- or laminate-covered side inwards.

EMBODIMENT 3

The wall heating panel consists of a two-channel aluminium collector 1 of a circular cross-section with integral stub pipes 2 and two parallel channels 3 and 4 four vertical aluminium heating elements 5, a plasterboard 6 for dry wall construction 40 mm thick, and elastic fill 7 and paper—aluminium foil laminate 8. Inside the collector 1 there are two horizontal parallel channels 3 and 4 of channel diameter 50 mm, whereby the top channel 3 of the phase transition has both ends permanently plugged by threaded joints with a plug and permanently sealed with anaerobic resin. With the collector 1 through the channel 3 there are connected 4 vertical aluminium heating elements 5 of the cross-section 625 sq mm through threaded joints and sealed with anaerobic resin, distributed evenly on the top surface of the collector 1 and entering into the channel 3 of the phase transition. Heating elements 5 are permanently plugged at the top. Heating elements 5 are arranged in the grooves corresponding to their shape in the plasterboard 6 for dry wall construction, sealed with gypsum and acrylic compound 7 and covered with glued paper—aluminium foil laminate 8, whereby the collector 1 connected with its top surface with the heating elements 5 adjoins the bottom surface of the plasterboard 6.

EMBODIMENT 4

The heating wall panel consists of a four-channel aluminium collector 1 of a rectangular cross-section with integral stub pipes 2 connected with the water channel 4, four parallel channels 3 and 4, whereby three channels 3 are phase transition channels, whereas the channel 4 is a water channel, seven vertical aluminium heating elements 5, a magnesium board 6 for dry wall construction 8 mm thick, and elastic fill 7 from acrylic resin and paper—aluminium foil laminate 8. Inside the collector 1 there are four parallel horizontal channels 3 and 4 of the channels diameter 3 mm, whereby the channels 3 of the phase transition have both ends permanently plugged with threaded joints with a plug and permanently sealed with anaerobic resin. There are seven vertical heating elements 5 of 1 sq mm cross-section permanently connected with the collector 1 through the channels 3 with the use of a shrink connection and sealed with anaerobic resin, distributed evenly on the top surface of the collector 1 and connected with three phase transition channels 3. The heating elements 5 are permanently plugged at the top and arranged in grooves corresponding to their shape in a magnesium board 6 for dry wall construction, where the magnesium board for dry wall construction is made from durable components of magnesium oxide and chloride, perlite and cellulose fibres, covered on both sides with a fibreglass net fused into the board surface, sealed with elastic gypsum and acrylic compound 7 and coated with paper—aluminium foil laminate 8, whereas the collector 1 adjoins its top surface with the vertical heating elements 5 to the bottom surface of the magnesium board 6. Inside the water channel 4 there is a spiral 9 from stainless steel or aluminium wire of 0.5-1.5 mm diameter and coils diameter equal to the diameter of the water channel, and of 2-20 mm pitch.

The invention claimed is:

1. A method for constructing a wall heating panel for a dry wall construction, comprising the steps of:
    forming, from an aluminium multi-channel profile, a collector having at least one horizontal phase transition channel and a water channel having stub pipes at both ends of the water channel for connecting the collector to a water heating installation;
    permanently plugging the ends of the at least one phase transition channel;
    connecting inseparably aluminium vertical heating elements, previously plugged at the top, with the at least one phase transition channel to form a system and checking the system for tightness;
    removing air from the system and filling the system with a thermodynamic medium in an amount of up to 95% of the system volume and tightly closing the system;
    inserting the vertical heating elements into previously made grooves of a dry wall construction board, such that the collector connected with the vertical heating elements adjoins a bottom edge of the dry wall construction board; and
    coating free spaces of the grooves with the vertical heating elements by an elastic compound.

2. The method according to claim 1, comprising connecting the collector with the vertical heating elements by heating the collector to a temperature from 200 to 400° C. and cooling the vertical heating elements to a temperature below −195° C. by immersion in a liquid nitrogen for up to 5 minutes, and then connecting permanently the collector and the vertical heating elements by using synchronised pneumatic cylinders to push forward the heated collector towards the cooled vertical heating elements.

3. The method according to claim 1, comprising screwing the vertical heating elements into openings made in the collector to connect the vertical heating elements with the phase transition channels, wherein a threaded joint between the vertical heating elements and the phase transition channels is degreased and sealed with an anaerobic resin.

4. The method according to claim 1, wherein the collector has a plurality of horizontal phase transition channels parallel to each other.

5. The method according to claim 1, wherein the dry wall construction board is a magnesium board.

6. The method according to claim 1, wherein the elastic compound is a gypsum and acrylic compound.

7. The method according to claim 1, further comprising applying a paper and aluminium foil laminate onto the whole surface of the dry wall construction board.

\* \* \* \* \*